(12) United States Patent
Yoshino

(10) Patent No.: US 11,691,463 B2
(45) Date of Patent: Jul. 4, 2023

(54) PNEUMATIC TIRE

(71) Applicant: Sumitomo Rubber Industries, Ltd., Kobe (JP)

(72) Inventor: Masayuki Yoshino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/743,920

(22) Filed: May 13, 2022

(65) Prior Publication Data

US 2022/0388349 A1 Dec. 8, 2022

(30) Foreign Application Priority Data

Jun. 3, 2021 (JP) .................................. 2021-093860

(51) Int. Cl.
*B60C 15/06* (2006.01)
*B60C 15/04* (2006.01)

(52) U.S. Cl.
CPC .......... *B60C 15/04* (2013.01); *B60C 15/0607* (2013.01); *B60C 2015/048* (2013.01); *B60C 2200/06* (2013.01)

(58) Field of Classification Search
CPC ..... B60C 15/04; B60C 15/06; B60C 15/0603; B60C 15/0607; B60C 2015/061; B60C 2015/0614; B60C 2015/0617; B60C 2015/0621; B60C 2015/0625
See application file for complete search history.

(56) References Cited

U.S. PATENT DOCUMENTS

2005/0045260 A1\* 3/2005 Maruoka ............. B60C 15/0027
152/554
2007/0056673 A1\* 3/2007 Maruoka ............. B60C 15/0607
152/554

FOREIGN PATENT DOCUMENTS

EP 458633 \* 11/1991
JP 2012-254736 A 12/2012

\* cited by examiner

*Primary Examiner* — Justin R Fischer
(74) *Attorney, Agent, or Firm* — Birch, Stewart, Kolasch & Birch, LLP

(57) ABSTRACT

A pneumatic tire includes a pair of bead portion, a pair of bead cores, a carcass extending between the pair of bead cores, and a pair of bead apex rubbers. Each bead core includes a core inner surface on an inner side in the tire radial direction of the bead core. In a pre-assemble state, each core inner surface has an angle of 20 degrees plus/minus 2 degrees to the tire axial direction, and is inclined outwardly in the tire radial direction toward an outer side in the tire axial direction. The bead apex rubber includes a first rubber portion arranged so as to cover a circumference of the bead core and having a circular or substantially elliptical outline, and a second rubber portion tapering outwardly in the tire radial direction from the first rubber portion. The first rubber portion is greater in hardness than the second rubber portion.

16 Claims, 3 Drawing Sheets

PNEUMATIC TIRE

RELATED APPLICATIONS

This application claims the benefit of foreign priority to Japanese Patent Application No. JP2021-093860, filed Jun. 3, 2021, which is incorporated by reference in its entirety.

FIELD OF THE INVENTION

The present disclosure relates to a pneumatic tire.

BACKGROUND OF THE INVENTION

The patent document 1 below discloses a heavy-duty tire which includes axially spaced bead cores and a carcass extending between the bead cores. The both ends of the carcass are turned up around the respective bead cores. Each bead core has a radially inner surface inclined at an angle of 20 degrees with respect to the tire axial direction and in a direction such that an inner diameter thereof increases outwardly in the tire axial direction. In such a tire, under a standard load state, each bead core rotates so that the inner surface of each bead core may become substantially parallel with the rim seat surface which is an outer surface of the rim seat. Thus, the tire may have excellent bead durability.

PATENT DOCUMENT

[Patent document 1] Japanese Unexamined Patent Application Publication No. 2012-254736

SUMMARY OF THE INVENTION

However, in the tire of Patent Document 1, carcass cords of the carcass may be inContact with and rub against the bead cores when the bead cores rotate under the standard load state. As a result, one or more carcass cords may be damaged or breakage (hereinafter, may be referred to as "CBU").

The present disclosure has been made in view of the above circumstances and has a major object to provide a pneumatic tire capable of improving bead durability by suppressing damage such as CBU.

In one aspect of the present disclosure, a pneumatic tire includes a pair of bead portion, a pair of bead cores each disposed in a respective one of the pair of bead portions, a carcass extending between the pair of bead cores, and a pair of bead apex rubbers each disposed in a respective one of the pair of bead portions and extending outwardly in a tire radial direction from a respective one of the pair of bead cores, wherein each bead core includes a core inner surface extending substantially straight on an inner side in the tire radial direction of the bead core, in a pre-assemble state where the tire is not mounted onto a rim and a width in a tire axial direction of the pair of bead portions is maintained at a rim width, each core inner surface has an angle of 20 degrees plus/minus 2 degrees with respect to the tire axial direction, and is inclined outwardly in the tire radial direction toward an outer side in the tire axial direction, in a tire cross-sectional view of each of the pair of bead portions, the bead apex rubber includes a first rubber portion arranged so as to cover a circumference of the bead core and having a circular or substantially elliptical outline, and a second rubber portion tapering outwardly in the tire radial direction from the first rubber portion, and the first rubber portion is greater in rubber hardness than the second rubber portion.

DETAILED DESCRIPTION OF THE INVENTION

Figure 1:
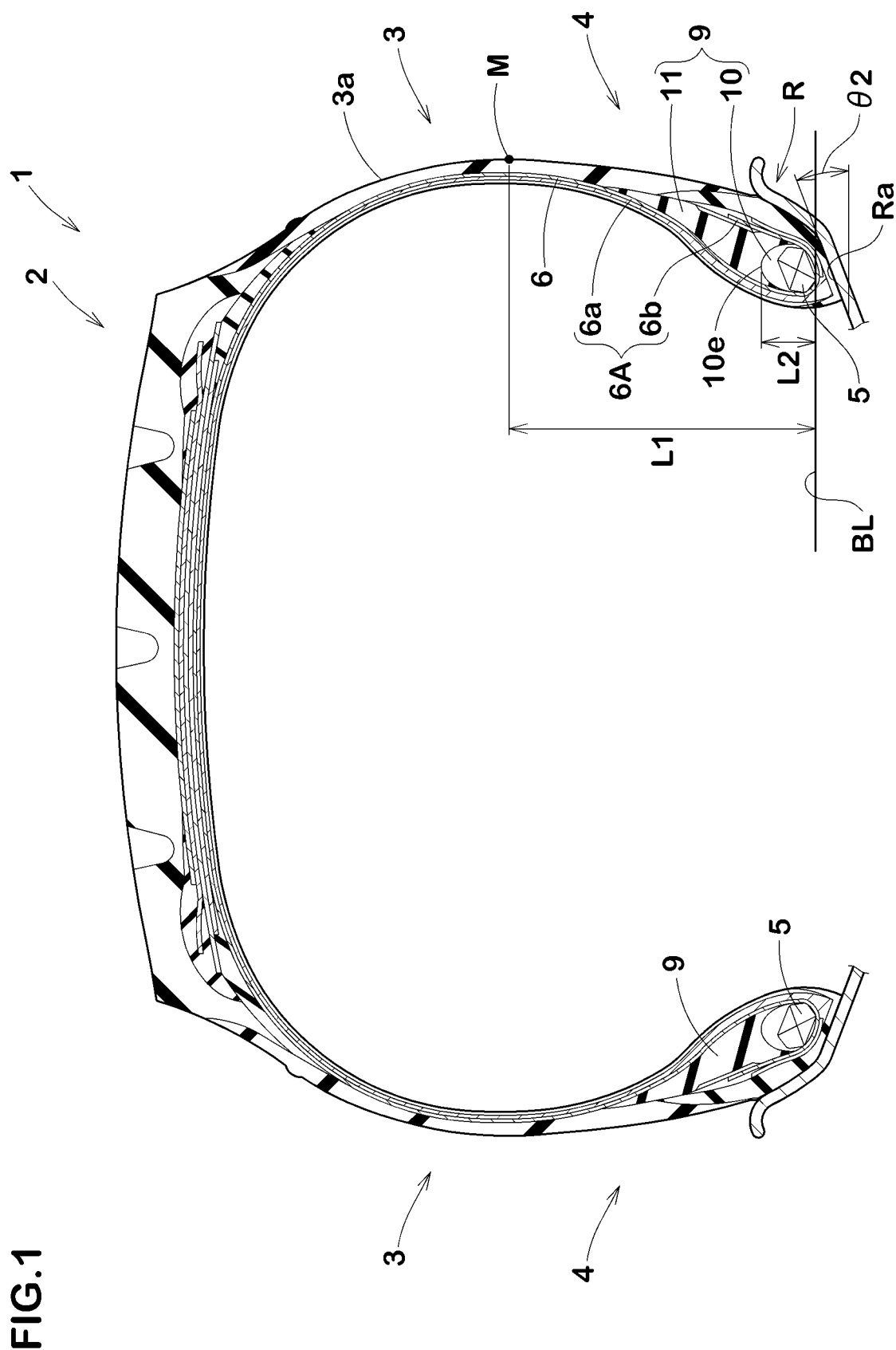
FIG. 1 is a cross-sectional view of a pneumatic tire in accordance with an embodiment of the present disclosure.

Hereinafter, one or more embodiments of the present disclosure will be described with reference to the drawings. FIG. 1 is a cross-sectional view of a pneumatic tire (hereafter, it may be simply referred to as "tire") 1 in accordance with an embodiment of the present disclosure. FIG. 1 is a cross sectional view including the tire axis of the tire in a normal state where the tire 1 is mounted onto a standard wheel rim (hereinafter, it may be simply referred to as "rim".) R. The present disclosure, for example, may be embodied as a heavy-duty tire. Alternatively, the present disclosure may be embodied as tires such as a passenger car tire, a light truck tire, and the like.

As used herein, the "normal state" is such that the tire 1 is mounted onto a standard wheel rim R with a standard pressure but loaded with no tire load. As used herein, unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example. As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The tire 1 according to the present embodiment includes a pair of bead portions 4, a pair of bead cores 5 each disposed in a respective one of the bead portions 4, and a carcass 6 extending between the pair of bead cores 5. Further, the tire 1 includes a pair of sidewall portions 3 and a tread portion 2 connecting the sidewall portions 3.

Figure 2:
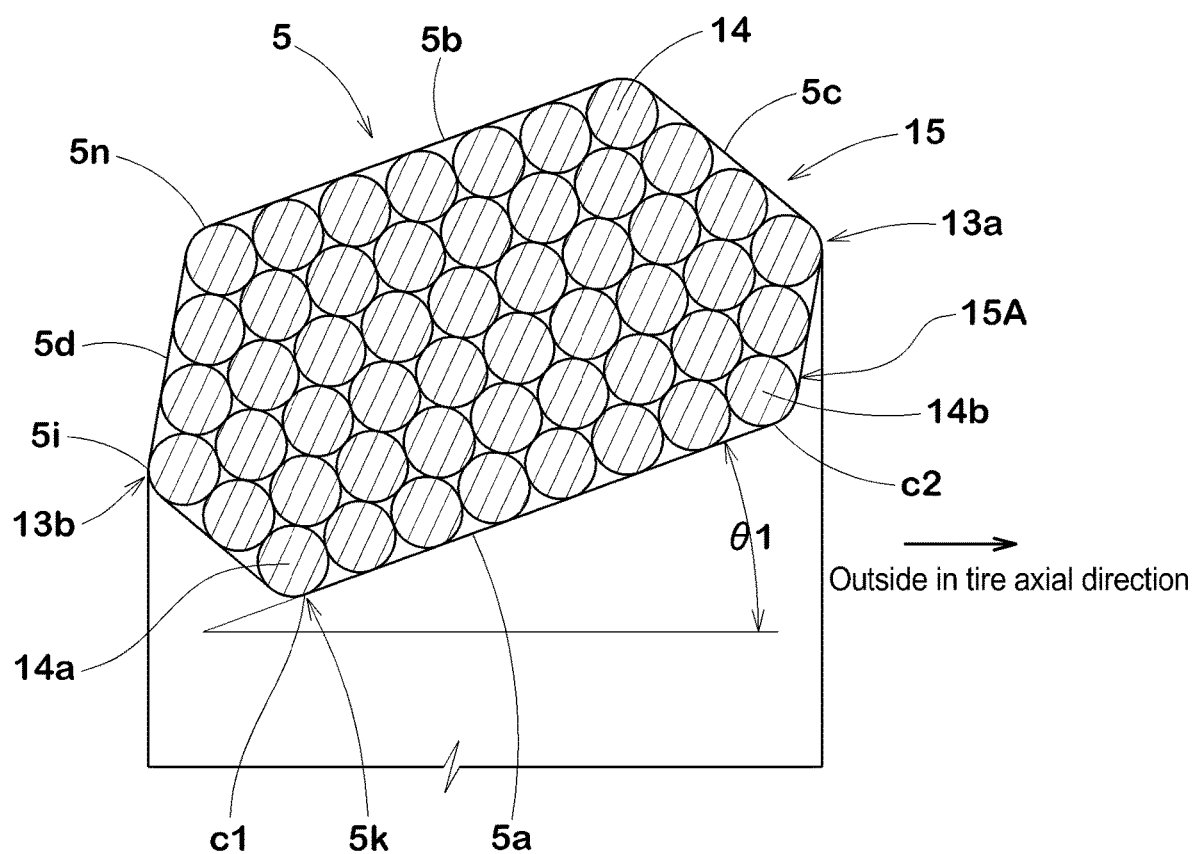
FIG. 2 is an enlarged view of a head core of the pneumatic tire in FIG. 1 in a pre-assemble state.

FIG. 2 illustrates an enlarged view of one of the bead cores 5 of the tire 1 in FIG. 1 in a pre-assemble state where the tire 1 is not mounted onto a rim and a width in a tire axial direction of the pair of bead portions is maintained at a rim width (not illustrated) of the rim to be mounted. As illustrated in FIG. 2, each of the bead cores 5 includes a core inner surface 5a extending substantially straight on an inner side in the tire radial direction of the bead core 5. The core inner surface 5a, when being mounted onto the rim, is a surface that extends along the rim seat Ra (shown in FIG. 1).

For example, in the pre-assemble state where the tire 1 is not mounted onto a rim and the width in a tire axial direction of the pair of bead portions is maintained at the rim width, the core inner surface 5a is inclined at an angle θ1 of 20 degrees plus/minus 2 degrees with respect to the tire axial direction in a direction such that an inner diameter thereof increases outwardly in the tire axial direction. When the tire 1 is in the normal state or a standard load state, the bead cores 5 rotates so that the core inner surface 5a may become substantially parallel with the rim seat Ra. Thus, the bead durability can be improved. The angle θ2 (shown in FIG. 1) of the rim seat Ra with respect to the tire axial direction is 15 degrees.

As used herein, the "standard loaded state" is such that the tire 1 under the normal state is grounded on a flat plane with a standard tire load at zero camber angles. As used herein, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example.

As illustrated in FIG. 1, a pair of bead apex rubbers 9 is disposed in the pair of bead portions 4. The bead apex rubbers 9 extend outwardly in the tire radial direction from the respective bead cores 5.

Each bead apex rubber 9, in a tire cross-sectional view, includes a first rubber portion 10 arranged so as to cover a circumference of the bead core 5 and having a circular or substantially elliptical outline, and a second rubber portion 11 tapering outwardly in the tire radial direction from the first rubber portion 10. Such a first rubber portion 10 can suppress the contact between the carcass 6 arranged around the bead core 5 and the bead core 5 even when the bead core 5 rotates, and can suppress the damage of the carcass 6. Thus, the tire 1 can suppress the occurrence of CBU (i.e., improving CBU resistance). In addition, such a first rubber portion 10 can absorb the shear strain between the carcass 6 and bead core 5 when the bead core rotates, suppressing the damage of the carcass 6. Note that each first rubber portion 10 according to the present embodiment is turned so as to cover the entire circumference of the bead core 5.

In each bead apex rubber 9, the first rubber portion 10 is greater in rubber hardness than the second rubber portion 11. Such a first rubber portion 10 can further suppress the contact between the carcass 6 and the bead core 5. Thus, the tire 1 according to the present embodiment can have excellent bead durability.

In the present embodiment, the carcass 6 is composed of a single carcass ply 6A. The carcass ply 6A, for example, includes a main portion 6a extending between the bead cores 5, and a pair of turn-up portions 6b each turned up around a respective one of the bead cores 5. The carcass ply 6A includes the carcass cords covered with a topping rubber (not illustrated).

As illustrated in FIG. 2, each bead core 5 according to the present embodiment has a substantially hexagonal cross-sectional shape including the core inner surface 5a. Each bead core 5, for example, further includes a core outer surface 5b facing the core inner surface 5a, a core axial outer surface 5c connecting the core inner surface 5a with the core outer surface 5b on an outer side in the tire axial direction, and a core axial inner surface 5d connecting the core inner surface 5a with the core outer surface 5b on an inner side in the tire axial direction. The core axial outer surface 5c, for example, includes a first bent portion 13a that bends outward in the tire axial direction. The core axial inner surface 5d, for example, includes a second bent portion 13b that bends inward in the tire axial direction. The core outer surface 5b, for example, extends substantially straight on an outer side in the tire radial direction of the bead core 5.

In the present embodiment, the innermost end 5i in the tire axial direction of each bead core 5 is located on the second bent portion 13b of the core axial inner surface 5d. In the present embodiment, the innermost end 5k in the tire radial direction of the bead core 5 is located on a position where the core inner surface 5a intersects the core axial inner surface 5d.

In the present embodiment, each bead core 5 is formed by winding a bead wire spirally in the tire circumferential direction. Each bead core 5, for example, includes a plurality of wire layers 15 superimposed in the tire radial direction, each wire layer 15 including the bead wire which is wound for multiple times spirally along the tire axial direction. The core inner surface 5a is formed by the innermost wire layer 15A arranged innermost in the tire radial direction. Note that the bead cores 5 is not limited to such an embodiment, but may be formed as an integrally molded product.

In this embodiment, the bead wire 14, for example, is a steel cord with a circular cross-sectional shape. In such a case, the angle θ1 of the core inner surface 5a is defined as an inclination angle of the straight line that connects two points c1 and c2 of the axially both end bead wire turns 14a and 14b on the most rim seat Ra side.

Figure 3:
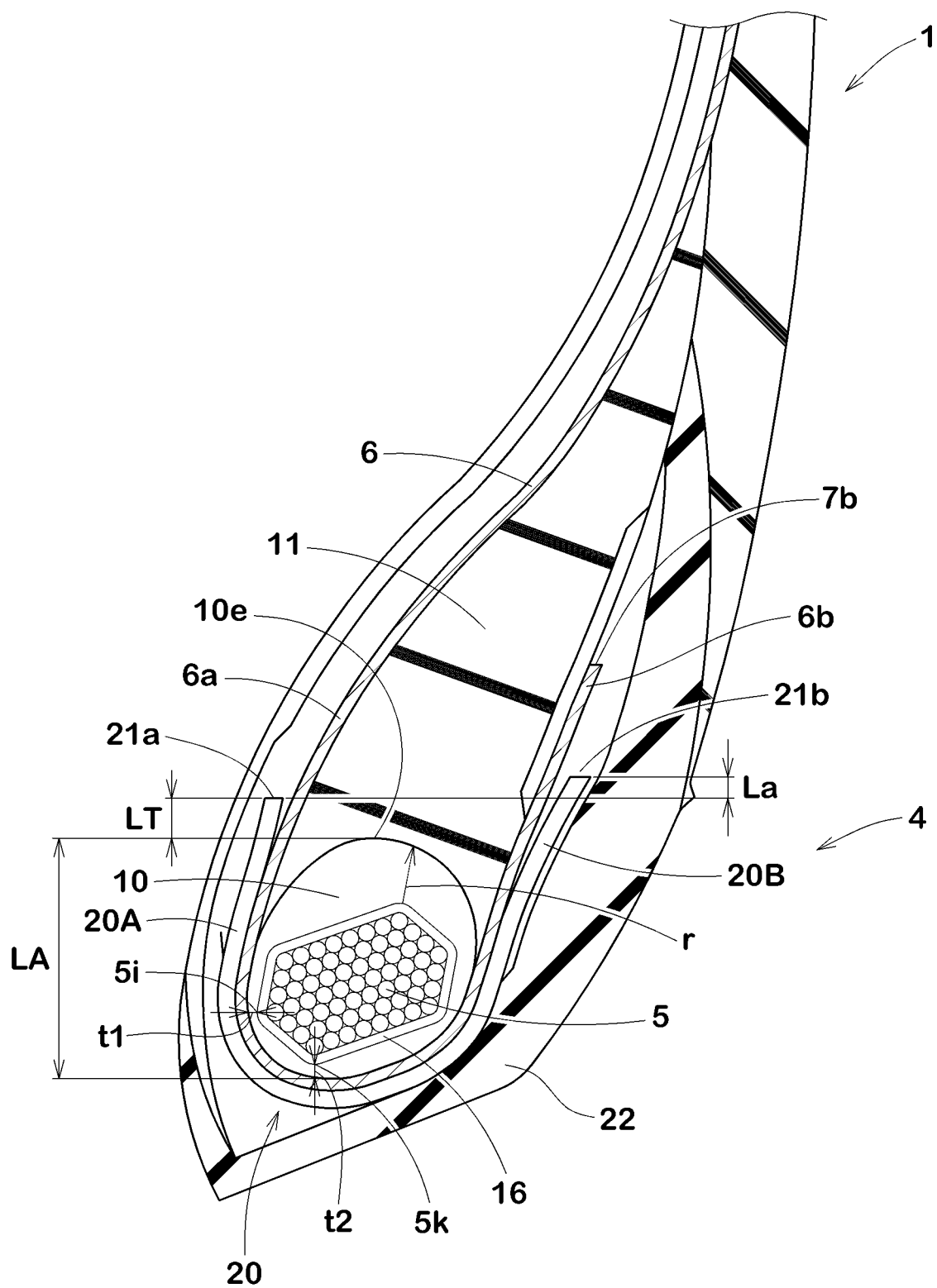
FIG. 3 is an enlarged view of the bead portion of FIG. 1.

FIG. 3 illustrates an enlarged view of one of the bead portions 4 of the tire 1 shown in FIG. 1. As illustrated in FIG. 1 in the present embodiment, each bead core 5 is surrounded by a canvas cloth 16 including an organic fiber cord. This can further suppress contact between the bead cores 5 and the carcass 6. As the organic fiber cord, for example, nylon fiber, rayon fiber, polyester fiber and aramid fiber may be preferable.

Each first rubber portion 10 according to this present embodiment, in a tire cross-sectional view, has a substantially elliptical outline. Alternatively, each first rubber portion. 10, in a tire cross-sectional view, may have a circular outline. As used herein, "a substantially elliptical outline" include not only an ellipse outline in the dictionary sense, but also an outline that consists of a plurality of arcs being convex outward with respect to the center of figure (not shown) of the first rubber portion 10 (including the bead cores 5). The substantially elliptical outline may include an aspect in which the radii of curvature (r) of the arcs changes continuously.

Preferably, a rubber hardness ha of the first rubber portion 10 is in a range of from 1.6 to 2.0 times a rubber hardness hb of the second rubber portions 11. When a rubber hardness ha of the first rubber portion 10 is equal to or more than 1.6 times a rubber hardness hb of the second rubber portions 11, the rigidity of the first rubber portion 10 can be maintained high, and the contact between the bead cores 5 and the carcass 6 can be suppressed. When a rubber hardness ha of the first rubber portion 10 is equal to or less than 2.0 times a rubber hardness hb of the second rubber portion 11, the rigidity of the second rubber portion 11 can be ensured and the deformation of the bead portions 4 can be suppressed. In addition, the rigidity of the first rubber portion 10 can be suppressed from becoming excessively large, and the damage of the carcass 6 by the first rubber portion 10 can be suppressed. As used herein, rubber hardness means durometer A hardness measured by the durometer type A in an environment of 23 degrees C. in accordance with JIS-K6253.

Although not particularly limited, a rubber hardness ha of the first rubber portion 10 in each bead portion 4 is preferably equal to or more than 75 degrees, more preferably equal to or more than 80 degrees, but preferably equal to or less than 100 degrees. For example, a rubber hardness hb of the second rubber portion 11 in each bead portion 4 is preferably equal to or more than 50 degrees, more preferably equal to or more than 55 degrees, but preferably equal to or less than 70 degrees, more preferably equal to or less than 65 degrees.

In each bead portion 4, a thickness t1 in the tire axial direction of the first rubber portion 10 at a location of the innermost end 5i in the tire axial direction of the bead core 5 is preferably in a range of from 1.0 to 2.0 mm. Further, in each bead portion 4, a thickness t2 in the tire radial direction of the first rubber portion 10 at a location of an innermost end 5k in the tire radial direction of the bead core 5 is preferably in a range of from 1.0 to 2.0 mm. When the tire 1 is filled with a standard pressure, the rotation of the bead cores 5 causes a relatively large shear strain in the first rubber portion 11 around the innermost ends 5i and 5k. By setting the thicknesses t1 and t2 at the innermost ends 5i and 5k to 1.0 mm or more, the contact between the bead cores 5 and the carcass 6 can be suppressed, and the damage to the carcass 6 can be suppressed. When the thicknesses t1 and t2 become excessively large, the fitting pressure with the rim R may decrease, and the bead durability may decrease. Thus, the thicknesses t1 and t2 are preferably 2.0 mm or less.

In order to ensure thicknesses t1 and t2 at locations of the inner ends 5i and 5k, respectively, a sheeted rubber material with a thickness of 1.0 mm is preferably used for the first rubber portion 10 on a location inward in the tire radial direction from the inner end 5i of the bead core 5. In the present embodiment, a portion of the first rubber portion 10 located inwardly in the tire axial direction of the core axial inner surface 5d is formed of a sheeted rubber material.

As illustrated in FIG. 1, in each of the pair of bead portions 4, a distance L2 in the tire radial direction from a bead baseline BL to the outermost end 10e of the first rubber portion 10 is in a range of from 10% to 65% of a distance L1 in the tire radial direction from the bead baseline BL to a tire maximum-width position M. The bead baseline BL is the tire axial line that defines the rim diameter of the rim R (see JATMA). As used herein, the tire maximum-width position M is the position where the outer surfaces 3a of the sidewall portions 3 projects most outward in the tire axial direction. The outer surfaces 3a are defined as a smooth curve specified by excluding partially formed irregularities (e.g., decorative serrations, marls display ribs, side protectors described below, etc.).

As illustrated in FIG. 3, a bead reinforcing layer 20 covering the carcass 6 is provided in each of the pair of bead portions 4. In a tire cross-sectional view, the bead reinforcing layer 20 extends in a U-shaped manner. More specifically, the head reinforcing layer 20 according to the present embodiment includes a first portion 20A extending along the main portion 6a, and a second portion 20B connected to the first portion 20A and turned up along one of the turn-up portions 6b. The second portion 20B has a radially outer end 21b terminating inwardly in the tire radial direction than an outer end 7b of the turn-up portion 6b.

In the present embodiment, the bead reinforcing layer 20 includes a plurality of parallelly arranged cords covered with a topping rubber (not illustrated). The plurality of cords is made of a steel cord and is inclined at an angle with respect to the tire radial direction. The topping rubber is made of a well-known rubber material. The bead reinforcing layer 20 can improve head durability by preventing the bead apex rubbers 9 from bending significantly.

The first portion 20A and the second portion 20B have the respective outer ends 21a and 21b in the tire radial direction. Preferably, the respective outer ends 21a and 21b are located outwardly in the tire radial direction with respect to the outer end 10e of the first rubber portion 10 by a distance equal to or more than 2 mm. This can help to suppress the rotation of the bead cores 5 while driving. From this point of view, a distance LT in the tire radial direction between each of the outer ends 21a and 21b of the first portion 20A and the second portion 20B and the outer end 10e of the first rubber portion 10 is preferably equal to or more than 4 mm. When the distance LT becomes excessively large, a rigidity step may occur in each bead portion 4, and the bead durability may deteriorate. Thus, the distance LT is preferably equal to or less than 8 mm, more preferably equal to or less than 6 mm.

In the present embodiment, the outer ends 21b of the second portion 20B is located outwardly in the tire radial direction than the outer end 21a of the first portion 20A. This makes it possible to more effectively suppress the rotation of the bead cores 5 while driving. A distance La in the tire radial direction between the outer end 21b of the second portion 20B and the outer end 21a of the first portion 20A is not particularly limited. From the viewpoint of effectively suppressing the rotation of the bead cores 5 while maintaining the rigidity balance of the bead portions 4, the distance La is preferably equal to or more than 5.0% of a length LA in the tire radial direction of the first rubber portion 10, more preferably equal to or more than 6.5%, but preferably equal to or less than 12%, more preferably equal to or less than 10%.

In the present embodiment, each of the bead portions 4 includes a chafer 22 in contact with the rim R (shown in FIG. 1). The chafer 22 is, for example, formed from crosslinked rubber. The chafer 22 is located outwardly in the tire axial direction of the bead reinforcing layer 20. The chafer 22, for example, extends inwardly in the tire radial direction of the bead reinforcing layer 20. In this embodiment, the chafer 22 also extends radially outwardly of the outer end 7b of the turn-up portion 6b.

While the particularly preferable embodiments of the tire in accordance with the present disclosure have been described in detail, the present disclosure is not limited to the illustrated embodiments, but can be modified and carried out in various aspects within the scope of the disclosure.

Example

Heavy-duty pneumatic tires of the size 275/80R22.5 with the basic structure shown in FIG. 1 were prepared based on the specifications in Table 1. Then, the bead durability performance of each test tire was tested. The common specifications and test methods for each test tire are as follows.

Rim size: 22.5×7.50

Tire inner pressure: 900 kPa

Bead Durability Performance Test:

Each test tire mounted onto the standard wheel rim was run on a drum tester at the speed of 20 km/h with the tire load of 79.50 kN. The inside of each test tire was filled with water. Then, the time until either one of the bead portions was damaged was measured. The test results are shown in Table 1 using as an index where Example 1 is set to 100. The larger the value, the better the bead durability.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| Angle of core inner surfaces under pre-assemble state (deg.) | 20 | 20 | 20 | 20 | 20 | 20 | 20 |
| Rubber hardness ha of first rubber portion | 97 | 97 | 97 | 97 | 97 | 97 | 97 |
| Rubber hardness hb of second rubber portion | 97 | 59 | 59 | 59 | 59 | 59 | 59 |
| Shape of first rubber portion | substantially ellipse | triangle | substantially ellipse | substantially ellipse | substantially ellipse | substantially ellipse | substantially ellipse |
| t1 (mm) | 1.0 | 1.0 | 1.0 | 0.5 | 2.0 | 2.5 | 1.0 |
| t2 (mm) | 1.0 | 1.0 | 1.0 | 0.5 | 2.0 | 2.5 | 1.0 |
| Canvas cloth | presence | presence | prerence | presence | presence | presence | presence |
| Ratio L2/L1 (%) | 23 | 23 | 23 | 23 | 23 | 23 | 57 |
| Distance LT (mm) | 5 | 5 | 5 | 5 | 5 | 5 | 5 |
| Bead durability [(index) Larger is better] | 85 | 87 | 100 | 97 | 102 | 98 | 100 |

|  | Ex. 6 | Ex. 7 | Ex. 8 | Ex. 9 | Ex. 10 | Ex. 11 |
| --- | --- | --- | --- | --- | --- | --- |
| Angle of core inner surfaces under pre-assemble state (deg.) | 20 | 20 | 20 | 20 | 20 | 20 |
| Rubber hardness ha of first rubber portion | 97 | 97 | 97 | 97 | 97 | 97 |
| Rubber hardness hb of second rubber portion | 59 | 59 | 59 | 59 | 59 | 59 |
| Shape of first rubber portion | substantially ellipse | substantially ellipse | substantially ellipse | substantially ellipse | substantially ellipse | substantially ellipse |
| t1 (mm) | 1.0 | 1.0 | 1.0 | 1.0 | 1.0 | 1.0 |
| t2 (mm) | 1.0 | 1.0 | 1.0 | 1.0 | 1.0 | 1.0 |
| Canvas cloth | presence | presence | presence | presence | presence | presence |
| Ratio L2/L1 (%) | 14 | 38 | 10 | 23 | 23 | 23 |
| Distance LT (mm) | 5 | 5 | 5 | 5 | 8 | 10 |
| Bead durability [(index) Larger is better] | 100 | 102 | 98 | 98 | 100 | 98 |

As shown in the Table 1, the tires of the examples have excellent bead durability.

[Additional Notes]

The present disclosure includes the following aspects.

[Note 1]

A pneumatic tire comprising:

a pair of bead portion;

a pair of bead cores each disposed in a respective one of the pair of bead portions;

a carcass extending between the pair of bead cores; and a pair of head apex rubbers each disposed in a respective one of the pair of bead portions and extending outwardly in a tire radial direction from a respective one of the pair of bead cores, wherein each bead core comprises a core inner surface extending substantially straight on an inner side in the tire radial direction of the bead core, in a pre-assemble state where the tire is not mounted onto a rim and a width in a tire axial direction of the pair of bead portions is maintained at a rim width, each core inner surface has an angle of 20 degrees plus/minus 2 degrees with respect to the tire axial direction, and is inclined outwardly in the tire radial direction toward an outer side in the tire axial direction, in a tire cross-sectional view of each of the pair of bead portions, the bead apex rubber comprises a first rubber portion arranged so as to cover a circumference of the bead core and having a circular or substantially elliptical outline, and a second rubber portion tapering outwardly in the tire radial direction from the first rubber portion, and the first rubber portion is greater in rubber hardness than the second rubber portion.

[Note 2]

The pneumatic tire according to note 1, wherein in each of the pair of bead portions, a distance in the tire radial direction from a bead baseline to an outermost end of the first rubber portion is in a range of from 10% to 65% of a distance in the tire radial direction from the bead baseline to a tire maximum-width position.

[Note 3]

The pneumatic tire according to note 1 or 2, wherein in each of the pair of bead portions, the first rubber portion has a thickness in the tire axial direction at a location of an innermost end in the tire axial direction of the bead core being in a range of from 1.0 to 2.0 mm.

[Note 4]

The pneumatic tire according to any one of notes 1 to 3, wherein in each of the pair of bead portions, the first rubber portion has a thickness in the tire radial direction at a location of an innermost end in the tire radial direction of the bead core being in a range of from 1.0 to 2.0 mm.

[Note 5]

The pneumatic tire according to any one of notes 1 to 4, wherein a rubber hardness of the first rubber portion is in a range of from 1.6 to 2.0 times a rubber hardness of the second rubber portion.

[Note 6]

The pneumatic tire according to any one of notes 1 to 5, further comprising a bead reinforcing layer covering the carcass in each of the pair of bead portions, wherein in a tire cross-sectional view, the bead reinforcing layer extends in a U-shaped manner, and both ends of the bead reinforcing layer are located outwardly in the tire radial direction with respect to an outermost end in the tire radial direction of the first rubber portion by a distance equal to or more than 2 mm.

[Note 7]

The pneumatic tire according to any one of notes 1 to 6, wherein each of the pair of bead cores is surrounded by a canvas cloth including an organic fiber cord.

[Note 8]

The pneumatic tire according to any one of notes 1 to 7, wherein the tire is a heavy-duty vehicle tire.

The invention claimed is:

1. A pneumatic tire comprising:
   a pair of bead portion;
   a pair of bead cores each disposed in a respective one of the pair of bead portions;
   a pair of sidewall portions;
   a carcass extending between the pair of bead cores via the pair of sidewall portions;
   a pair of sidewall rubber layers disposed axially outwardly of the carcass in the pair of sidewall portions;
   a pair of bead reinforcing layers covering the carcass in the pair of bead portions; and
   a pair of bead apex rubbers each disposed in a respective one of the pair of bead portions and extending outwardly in a tire radial direction from a respective one of the pair of bead cores, each bead apex rubber having a radially outermost end that is in contact with both the carcass and the sidewall rubber layer directly in each bead portion,
   wherein
   each bead core comprises a core inner surface extending substantially straight on an inner side in the tire radial direction of the bead core,
   in a pre-assemble state where the tire is not mounted onto a rim and a width in a tire axial direction of the pair of bead portions is maintained at a rim width, each core inner surface has an angle of 20 degrees plus/minus 2 degrees with respect to the tire axial direction, and is inclined outwardly in the tire radial direction toward an outer side in the tire axial direction,
   in a tire cross-sectional view of each of the pair of bead portions, the bead apex rubber consists of a first rubber portion arranged so as to cover a circumference of the bead core and having a circular or substantially elliptical outline, and a second rubber portion tapering outwardly in the tire radial direction from the first rubber portion to the radially outermost end of the bead apex rubber,
   the first rubber portion and the second rubber portion are directly in contact with each other,
   the first rubber portion is greater in rubber hardness than the second rubber portion,
   the first rubber portion has a rubber hardness ha in a range from 75 to 100 degrees,
   the second rubber portion a rubber hardness hb in a range from 50 to 70 degrees,
   in a tire cross-sectional view, the bead reinforcing layer extends in a U-shaped manner, and
   both ends of the bead reinforcing layer are located outwardly in the tire radial direction with respect to an outermost end in the tire radial direction of the first rubber portion by a distance in a range from 5 to 8 mm.

2. The pneumatic tire according to claim 1, wherein in each of the pair of bead portions, a distance in the tire radial direction from a bead baseline to an outermost end of the first rubber portion is in a range of from 10% to 65% of a distance in the tire radial direction from the bead baseline to a tire maximum-width position.

3. The pneumatic tire according to claim 2, wherein in each of the pair of bead portions, the first rubber portion has a thickness in the tire axial direction at a location of an innermost end in the tire axial direction of the bead core being in a range of from 1.0 to 2.0 mm.

4. The pneumatic tire according to claim 2, wherein in each of the pair of bead portions, the first rubber portion has a thickness in the tire radial direction at a location of an innermost end in the tire radial direction of the bead core being in a range of from 1.0 to 2.0 mm.

5. The pneumatic tire according to claim 2, wherein a rubber hardness of the first rubber portion is in a range of from 1.6 to 2.0 times a rubber hardness of the second rubber portion.

6. The pneumatic tire according to claim 1, wherein in each of the pair of bead portions, the first rubber portion has a thickness in the tire axial direction at a location of an innermost end in the tire axial direction of the bead core being in a range of from 1.0 to 2.0 mm.

7. The pneumatic tire according to claim 6, wherein in each of the pair of bead portions, the first rubber portion has a thickness in the tire radial direction at a location of an innermost end in the tire radial direction of the bead core being in a range of from 1.0 to 2.0 mm.

8. The pneumatic tire according to claim 6, wherein a rubber hardness of the first rubber portion is in a range of from 1.6 to 2.0 times a rubber hardness of the second rubber portion.

9. The pneumatic tire according to claim 1, wherein in each of the pair of bead portions, the first rubber portion has a thickness in the tire radial direction at a location of an innermost end in the tire radial direction of the bead core being in a range of from 1.0 to 2.0 mm.

10. The pneumatic tire according to claim 9, wherein a rubber hardness of the first rubber portion is in a range of from 1.6 to 2.0 times a rubber hardness of the second rubber portion.

11. The pneumatic tire according to claim 1, wherein a rubber hardness of the first rubber portion is in a range of from 1.6 to 2.0 times a rubber hardness of the second rubber portion.

12. The pneumatic tire according to claim 1, wherein each of the pair of bead cores is surrounded by a canvas cloth including an organic fiber cord.

13. The pneumatic tire according to claim 12, wherein the first rubber portion covers an entire circumference of the canvas cloth.

14. The pneumatic tire according to claim 1, wherein the tire is a heavy-duty vehicle tire.

15. The pneumatic tire according to claim 1, wherein in a tire cross-sectional view of each of the pair of bead portions, the first rubber portion has a substantially elliptical outline consisting of a plurality of arcs.

16. The pneumatic tire according to claim 1, wherein the first rubber portion covers an entire circumference of the bead core.

* * * * *